US009878191B2

(12) United States Patent
Hoelen et al.

(10) Patent No.: US 9,878,191 B2
(45) Date of Patent: Jan. 30, 2018

(54) SYSTEM FOR TREATING CONTAMINATED SOIL

(71) Applicant: Chevron U.S.A. Inc., San Ramon, CA (US)

(72) Inventors: Thomas Peter Hoelen, Berkeley, CA (US); Gabriel P. Sabadell, The Woodlands, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 15/664,266

(22) Filed: Jul. 31, 2017

(65) Prior Publication Data
US 2017/0361142 A1 Dec. 21, 2017

Related U.S. Application Data

(62) Division of application No. 15/188,023, filed on Jun. 21, 2016.

(51) Int. Cl.
B01J 19/18 (2006.01)
A62D 3/38 (2007.01)
B01J 8/08 (2006.01)
B01J 8/10 (2006.01)
B01J 8/24 (2006.01)
A62D 101/20 (2007.01)

(52) U.S. Cl.
CPC .......... A62D 3/38 (2013.01); B01J 8/085 (2013.01); B01J 8/087 (2013.01); B01J 8/10 (2013.01); B01J 8/24 (2013.01); A62D 2101/20 (2013.01); B01J 2208/00752 (2013.01); B01J 2208/00858 (2013.01); B01J 2208/00893 (2013.01)

(58) Field of Classification Search
CPC ...................................................... B01J 19/18
USPC ...................................................... 422/225
See application file for complete search history.

(56) References Cited

U.S. PATENT DOCUMENTS

| | | | |
|---|---|---|---|
| 5,259,962 | A | 11/1993 | Later |
| 5,753,494 | A | 5/1998 | Hater et al. |
| 5,849,201 | A | 12/1998 | Bradley |
| 6,805,518 | B2 | 10/2004 | Bruso |
| 8,728,281 | B2 | 5/2014 | Browne et al. |
| 8,882,969 | B2 | 11/2014 | Kapila et al. |
| 2015/0360065 | A1 | 12/2015 | Hoelen et al. |

OTHER PUBLICATIONS

Adams, Craig D.; "Effects of Ozonation on the Biodegradability of Substituted Phenols"; Wat. Res., vol. 31, No. 10, pp. 2655-2663.
Ahn, Yeonghee, et al.; "Monitoring of Petroleum Hydrocarbon Degradative Potential of Indigenous Microorganisms in Ozonated Soil"; Biodegradation, (2005), vol. 16, pp. 45-56.
Bijan, Leila, et al; "Integrated Ozone and Biotreatment of Pulp Mill Effluent and Changes in Biodegradability and Molecular Weight Distribution of Organic Compounds"; Water Research, (2005), vol. 39, pp. 3763-3772.
Brame, Jonathon, et al.; "Photocatalytic Pre-Treatment with Food-Grade $TiO_2$ Increases the Bioavailability and Bioremediation Potential of Weathered Oil from the Deepwater Horizon Oil Spill in the Gulf of Mexico"; Chemosphere, (2013), vol. 90, pp. 2315-2319.
Choi, Heechul, et al.; "Transport Characteristics of Gas Phase Ozoe in Unsaturated Porous Media for In-Situ Chemical Oxidation"; Journal of Contaminant Hydrology, vol. 56, (2002), pp. 81-98.
Giamalva, David H., et al.; "Kinetics of Ozonation. 6. Polycyclic Aliphatic Hydrocarbons"; J. Org. Chem., (1988), vol. 53, pp. 3429-3432.
Javorska, Hana, et al.: "Effect of Ozonation on Polychlorinated Biphenyl Degradation and on Soil Physico-Chemical Properties"; Journal of Hazardous Materials, (2009), vol. 161, pp. 1202-1207.
Jonsson, Sofia, et al.; "Comparison of Fenton's Reagent and Ozone Oxidation of Polycyclic Aromatic Hydrocarbons in Aged Contaminated Soils"; Research Articles, J. Soils Sediments, (2006), vol. 6, No. 4, pp. 208-214.
Kulik, Niina, et al.; "Degradation of Polycyclic Aromatic Hydrocarbons by Combined Chemical Pre-Oxidation and Bioremediation in Creosote Contaminated Soil"; Journal of Environmental Management, (2006), vol. 78, pp. 382-391.
Lee, Byung-Tae, et al.; "Ozonation of Diesel Fuel in Unsaturated Porous Media"; Applied Geochemistry, (2002), vol. 17, pp. 1165-1170.
Liang, Yuting, et al.; "Microaffay-Based Analysis of Microbial Functional Diversity Along an Oil Contamination Gradient in Oil Field"; FEMS Microbiol Ecol, (2009), vol. 70, pp. 324-333.
Masten, Susan J., et al.; "Efficacy of In-Situ Ozonation for the Remediation of PAH Contaminated Soils"; Journal of Contamination Hydrology, (1997), vol. 28, pp. 327-335.

(Continued)

Primary Examiner — Edward Johnson
(74) Attorney, Agent, or Firm — Karen R. DiDomenicis

(57) ABSTRACT

Disclosed are a process and a system for treating contaminated soil. The process includes introducing a contaminated soil to an agitation unit. Ozone is supplied to the agitation unit thereby forming a soil-gas mixture, and the soil-gas mixture is agitated for sufficient time for the ozone to contact the contaminants thereby forming an ozone-treated soil and a residual gas-particulates mixture. The ozone-treated soil and the residual gas-particulates mixture are removed from the agitation unit. If necessary, remaining ozone is then flushed from the soil. The process occurs under negative pressure to prevent ozone from being released to the atmosphere.

13 Claims, 3 Drawing Sheets

(56) References Cited

OTHER PUBLICATIONS

Mohan, S. Venkata, et al.; "Bioremediation Technologies for Treatment of PAH-Contaminated Soil and Strategies to Enhance Process Efficiency"; Rev. Environ. Sci. Biotechnol., (2006), vol. 5, pp. 347-374.
O'Mahony, Mark M., et al.; "The Use of Ozone in the Remediation of Polycyclic Aromatic Hydrocarbon Contaminated Soil"; Chemosphere, (2006), vol. 63, pp. 307-314.
Russo, Lara, et al.; "Ozone Oxidation and Aerobic Biodegradation with Spent Mushroom Compost for Detoxification and Benzo(a)pyrene Removal from Contaminated Soil"; Chemosphere, (2012), vol. 87, pp. 595-601.
Yu, Do-Yun, et al.; "Characteristics in Oxidative Degradation by Ozone for Saturated Hydrocarbons in Soil Contaminated with Diesel Fuel"; Chemosphere, (2007), vol. 66, pp. 799-807.
Zeng, Yu, et al.; "Integrated Chemical-Biological Treatment of Benzo[a]pyrene"; Environ. Sci. Technol., (2000), vol. 34, pp. 854-862.

SYSTEM FOR TREATING CONTAMINATED SOIL

This application is a divisional of and claims the benefit of U.S. Non-Provisional application Ser. No. 15/188,023, filed Jun. 21, 2016. The disclosures of which are expressly incorporated herein by reference.

BACKGROUND

Field

Soils can be contaminated with organic contaminants such as petroleum hydrocarbons and may require remediation or treatment. Treatment objectives can include reduction in Total Petroleum Hydrocarbons (TPH), reduction in toxicity, improvement in aesthetics and/or improvement in soil quality. Current approaches to remediation of petroleum impacted sites include excavation and disposal, biological treatment and thermal treatment. Although each of these approaches can be effective to reach treatment objectives, each has drawbacks including time needed for treatment, quality and final TPH content of treated soil, and cost. Improvements to these technologies such as increased bioremediation rates, lower TPH end points, lower energy needs or lower operating temperatures would result in cost savings and/or improved environmental stewardship.

There exists a need for a less costly, faster method and system for remediating hydrocarbon impacted soil without sacrificing effectiveness.

SUMMARY

In one aspect, the invention relates to a system for treating contaminated soil, the system including: an agitation unit adapted for agitating a soil-gas mixture having a soil inlet, a soil outlet, an ozone gas inlet and a gas-particulates mixture outlet; a source of ozone connected to the ozone gas inlet; and a vacuum pump connected to the gas-particulates mixture outlet such that the vacuum pump can maintain the system under negative pressure.

DESCRIPTION OF THE DRAWINGS

These and other objects, features and advantages of the present invention will become better understood with reference to the following description, appended claims and accompanying drawings. The drawings are not considered limiting of the scope of the appended claims. The elements shown in the drawings are not necessarily to scale. Reference numerals designate like or corresponding, but not necessarily identical, elements.

DETAILED DESCRIPTION

Figure 1:
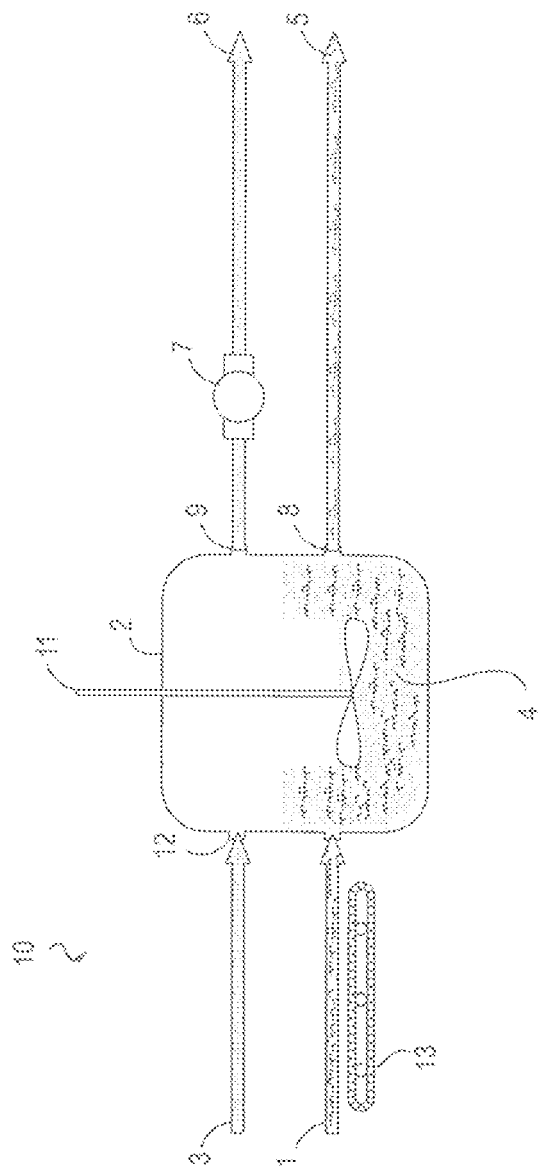
FIG. 1 is a schematic diagram illustrating a system for treating contaminated soil according to one embodiment.

Processes and systems for treating contaminated soil will now be described. The term "soil" herein refers to a mixture containing minerals, organic matter, gases, liquid and/or microbial organisms. The term "contaminated soil" herein refers to soil containing contaminants, including organic compounds such as, but not limited to, hydrocarbons or any unwanted compound that benefits from oxidation. In one embodiment, the contaminant is an organic compound. Examples of organic compounds include, but are not limited to, herbicides, pesticides, fungicides, solvents, surfactants, animal or human waste, vegetable oils, alcohols and glycols. In one embodiment, the contaminant is a biodiesel. In one embodiment, the contaminant is a petroleum compound. Examples of petroleum compounds include, but are not limited to, any compounds that may be present in crude oil, condensate, refined products, and waste from oil and gas production or processing. Throughout this disclosure, it is to be understood that the term "hydrocarbons" may be used for convenience although the methods and systems disclosed herein are intended to be applicable to other contaminants as well. The level of contamination present in the soil can vary widely. In one embodiment, the contamination is present between 10 ppb and 50 wt %. FIG. 1 illustrates a system 10 according to one embodiment. Referring to FIG. 1, a process according to one embodiment includes introducing a contaminated soil 1 to an agitation unit 2 through a soil inlet 11. Ozone 3 is supplied to the agitation unit 2 through a gas inlet 12. The agitation unit 2 combines the ozone with the contaminated soil thereby forming a soil-gas mixture 4 within the agitation unit 2. The soil-gas mixture 4 is then agitated for sufficient time for the ozone within the soil-gas mixture 4 to contact the hydrocarbons within the soil-gas mixture 4. The ozone reacts with the organic material present in the soil-gas mixture 4, including a wide range of petroleum hydrocarbon compounds, present in the gas and soil within the agitation unit 2. The concentration of the ozone 3 added to the agitation unit 2 will depend on treatment objectives and soil composition. In some embodiments, the concentration ranges from 0.01 to 25 wt. % based on the weight of the soil; in some embodiments, the concentration ranges from 0.25 to 1 wt. % based on the weight of the soil. An ozone-treated soil 5, also referred to herein as treated soil, is thereby formed. Upon reaction with ozone, the organic materials present are oxidized to carbonic gases or transformed to partially oxidized organic compounds.

A residual gas-particulates mixture 6, also referred to herein as exhaust gas, containing gas and dust particles, is therefore also formed within the agitation unit 2 as a result of the mixing of the soil and ozone.

The ozone-treated soil 5 is removed from the agitation unit 2 from a treated soil outlet 8.

The residual gas-particulates mixture 6 is removed from the agitation unit 2 from an exhaust gas outlet 9. The agitation unit 2 can be any apparatus suitable for agitating the soil-gas mixture 4 in a way that facilitates efficacious contact between the ozone 3 and the hydrocarbons within the soil-gas mixture 4 to improve the reaction conditions between the ozone and the hydrocarbons. Such apparatus can include rotating drums, tumblers, shaking or vibrating drums, rotary kilns, pug mills, screw type mixers, cascading mixers, fluidized bed reactors, shaking or vibrating conveyor belts, enclosed inclined shaker trays, and other apparatus apparent to those of ordinary skill in the art. FIG. 1 includes a simple schematic representation of an agitation unit 2. It is to be understood that the simple schematic used in the figures does not limit the type of unit contemplated herein.

A vacuum pump 7 can be connected to the exhaust gas outlet 9 such that the process occurs under negative pressure to prevent ozone from being released to the atmosphere. The amount of vacuum needed will be determined by the size of the equipment in the system, how many pieces of equipment are downstream of the agitation unit 2, the size of piping used, how many fine particles are generated, and so on, since this will determine the pressure losses throughout the system 10. Therefore, the appropriate vacuum will be specific to the system design. It will be sufficient to capture substantially all of the ozone and contain it until treated or recycled. In one embodiment, the vacuum pump 7 provides a system pressure of around 0.8 atm.

An optional conveyor 13 can be used to feed the contaminated soil 1 to the soil inlet 12 of the agitation unit 2. In some embodiments, a conveyor 13B can be provided for facilitating removal of the soil-gas mixture 4 from the agitation unit 2. The process can be carried out continuously or batch wise.

Figure 2:
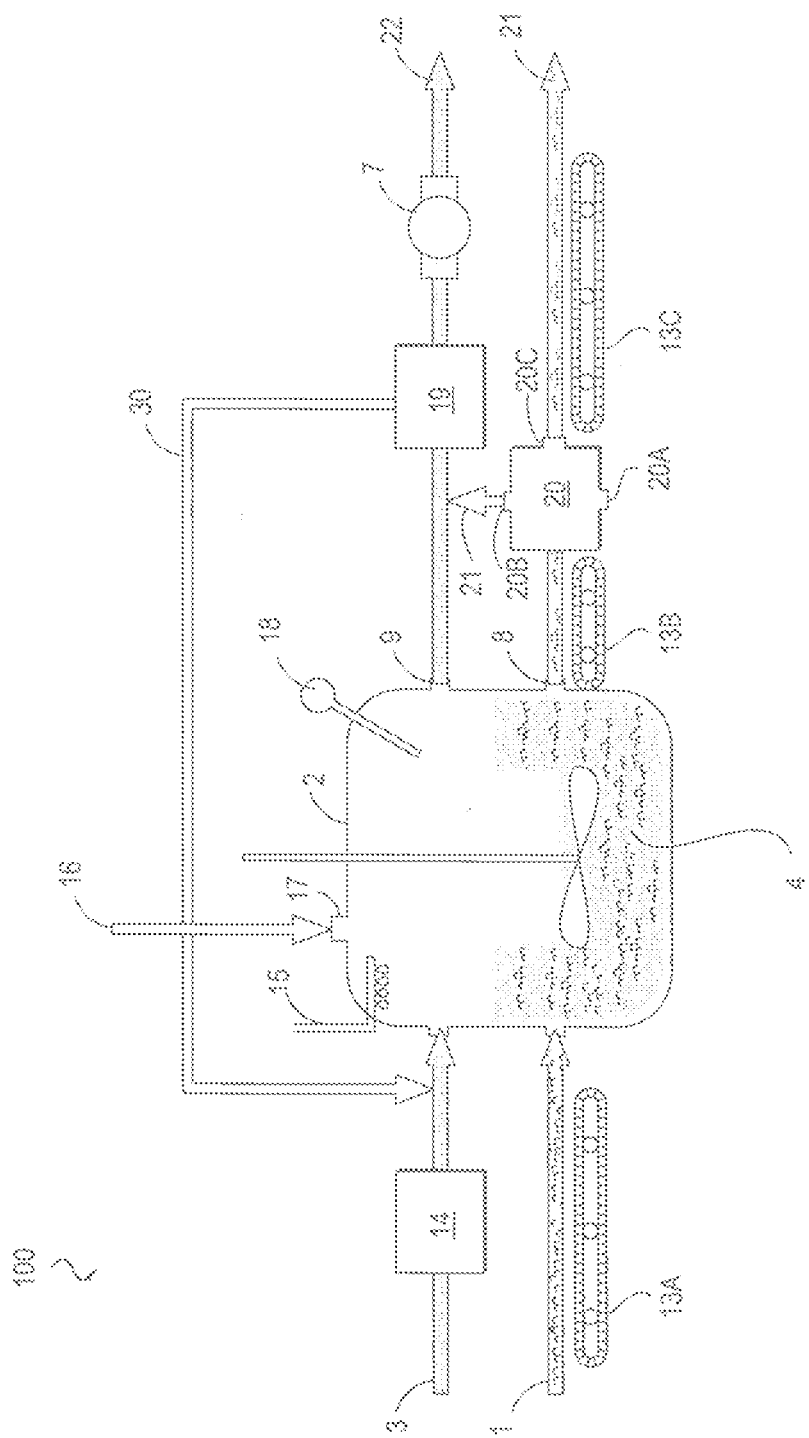
FIG. 2 is a schematic diagram illustrating a system for treating contaminated soil according to another embodiment.

FIG. 2 illustrates a system 100 according to another embodiment. System 100 includes the above-described components as well as additional optional system components. In one embodiment, an ozone generator 14 is provided upstream of the inlet to the agitation unit 2 for providing ozone. In one embodiment, upon removing the soil-gas mixture 4 from the agitation unit 2, ozone is flushed from the soil in an ozone flushing unit 20. In one embodiment, the ozone flushing unit 20 can be connected to the soil outlet 8. The ozone flushing unit 20 can be a contained enclosure having a gas inlet 20A, a gas outlet 20B and a soil outlet 20C. An optional conveyor 13C can be provided for removing soil from the ozone flushing unit 20. A gas source (not shown) such as an air source can be connected to the gas inlet 20A, and the gas can be forced through the treated soil, thereby driving out the residual ozone, which can be removed via the gas outlet 20B. In one embodiment, the ozone can then be fed to an ozone removal unit 19 by way of a line 21 from the gas outlet 20B, which can also be connected to the exhaust gas outlet 9. The ozone removal unit 19 disposes of the ozone from the agitation unit 2 and the optional ozone flushing unit 20. In one embodiment, ozone is converted to oxygen in the ozone removal unit 19 by any of various means, including catalytic or chemical conversion.

In some embodiments, ozone-containing gas is removed from the residual gas-particulates mixture in the agitation unit 2 and recycled to an inlet to the agitation unit 2. In one embodiment, ozone from the ozone removal unit 19 is recycled to an inlet to the agitation unit 2 through line 30.

As shown, the vacuum pump 7 maintains the system including the ozone removal unit 19 under negative pressure.

The agitation unit 2 can further include an inlet 17 for the addition of soil amendments 16 that may be added to the soil-gas mixture 4 that are useful in improving the efficacy of the process. Such soil amendments may include but are not limited to polymers, surfactants, solvents, oxidizers and combinations thereof.

The agitation unit 2 can further include a heating system 15 for heating the soil-gas mixture 4 to achieve an optimum moisture level and/or temperature for the reaction of the ozone and the hydrocarbons in the soil within the soil-gas mixture 4. Removal of water from the soil during the disclosed process can be important depending on the initial moisture level of the soil since water can limit transport of ozone between the gas phase and the organic materials within the soil matrix. Therefore, removing water can in some cases strongly increase reaction rates and reduce the residence time necessary.

In some embodiments, operating temperatures can range from 0° C. to 100° C. It is noted that in some embodiments, relatively low operating temperatures, i.e., from 30° C. to 60° C., will reduce operating costs, improve safety, and will not destroy or harm the natural soil properties, as compared to current thermal treatment methods that operate at high temperatures, such as soil combustion and thermal desorption. In some embodiments, the temperature can range from 40° C. to 50° C.

The heating system 15 can take any of a number of known mechanisms for providing heat. For instance, a heating coil or heating element 15 that operates by resistive heating can be placed within the agitation unit 2. In another embodiment, the agitation unit 2 itself, i.e., the walls of the agitation unit 2, can be heated such that the walls transfer heat to the soil-gas mixture 4 there within. In another embodiment, heated air or steam can be supplied to the agitation unit 2.

In some embodiments, one or more sensors or probes 18 can be provided within the agitation unit 2 for monitoring conditions including, but not limited to, temperature, moisture level and/or ozone concentration. Such sensors can be connected to a control system if desired. A desired level of moisture associated with the soil and air can be maintained to improve reactivity between the ozone and the hydrocarbons in the soil.

Figure 3:
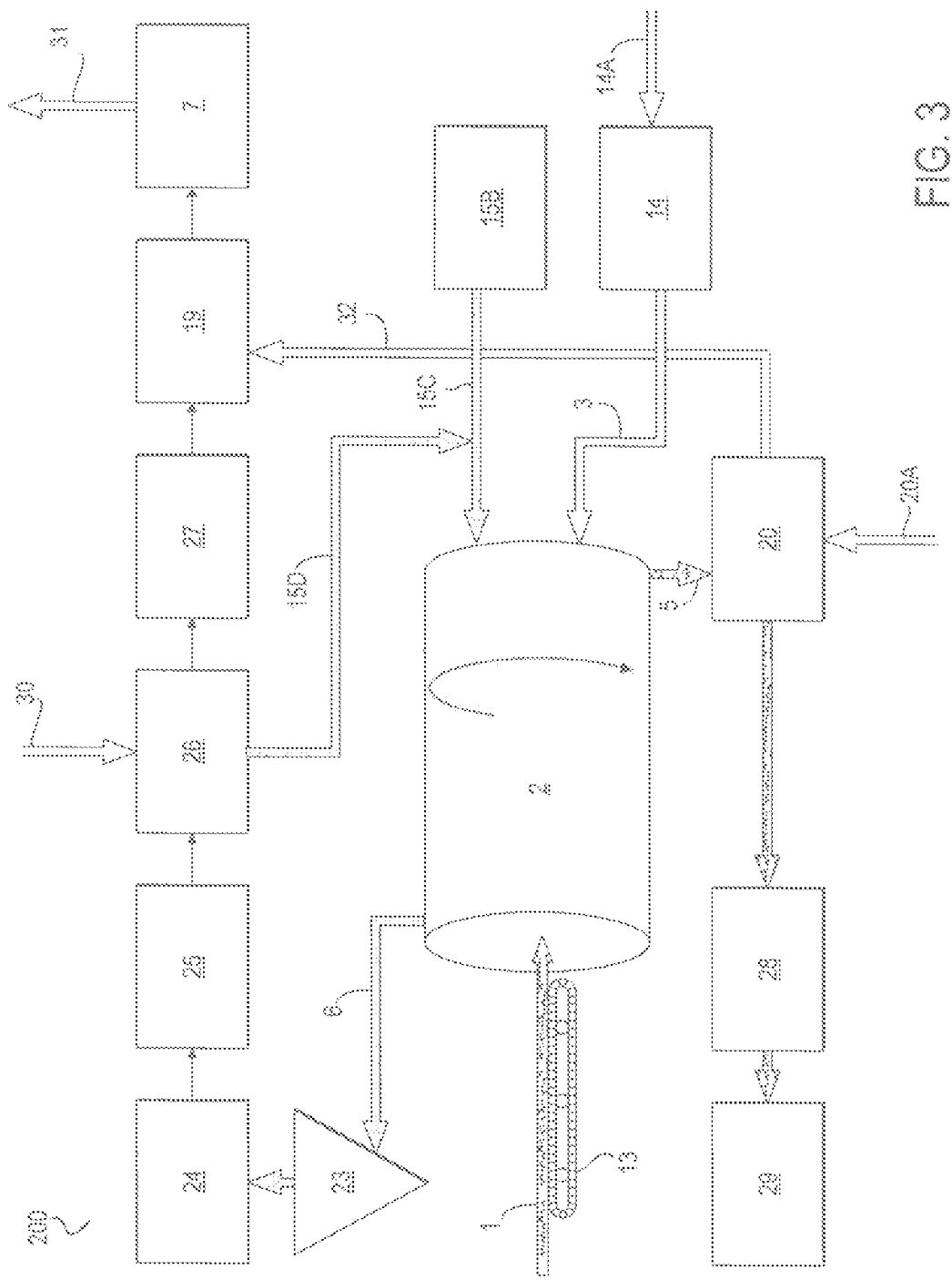
FIG. 3 is a schematic diagram illustrating a system for treating contaminated soil according to yet another embodiment.

FIG. 3 illustrates an exemplary system 200 according to one embodiment. In the example illustrated, contaminated soil 1 is fed to a rotating drum 2 using a conveyor 13, e.g., in a hopper and conveyor system. Within the rotating drum 2, the soil is heated and contacted with the gas phase ozone 3 within the rotating drum 2 while cascading down the rotating drum 2 as a result of gravity. The dried and ozone treated soil 5 exits the rotating drum 2 at a low point. Heated air or steam 15C from furnace or steam generator 15B and ozone 3 from ozone generator 14 are introduced into the rotating drum 2 and flow upwards and are collected at an upper portion of the drum. Air 14A is supplied to the ozone generator 14. Soil will therefore be heated through a temperature gradient, such that the soil is at the lowest temperature when entering and the highest temperature when exiting the rotating drum 2.

Effluent gas 6 leaving the upper end of the rotating drum 2 can pass through a cyclone 23 for removing dust particles from the gas 6. Volatile petroleum hydrocarbon vapors can then be condensed and collected from the effluent gas 6 in an optional chilled trap (also referred to as a VOC/water condenser) 24. The effluent gas is then routed through a gas fired thermal oxidizer (afterburner) 25 to destroy any remaining organic compounds through incineration and decomposition. The gas is then cooled. The gas can pass through a heat exchanger 26 to exchange heat with ambient air 30 which in turn can be used to heat the rotating drum 2. The heat exchanger 26 takes ambient air 30 and warms it with heat from the gas from the thermal oxidizer 25. This warmed air 15D can then be used in the rotating drum 2 to increase the temperature of the soil-gas mixture 4 in the rotating drum 2. This may be desirable to control the moisture level within the soil-gas mixture 4. As an alternative or in addition to warmed air 15D from the heat exchanger 26, an air heating furnace or steam generator 15B can be used to supply warm air and/or steam 15C to the rotating drum 2. Alternatively, the gas can pass through a heat exchanger using contact or non-contact water cooling, or non-contact air cooling. The gas can then be passed through a baghouse filter 27 for dust removal. Finally, the gas can be treated for catalytic removal of any remaining ozone in an ozone removal unit 19 in which ozone is converted to oxygen, and released to the atmosphere as exhaust gas 31.

Ozone gas can be produced from air using an electric ozone generator 14 and injected into the rotating drum 2 at the lower end. Treated soil 5 exiting the rotating drum 2 can be flushed with air 20A in a gas flushing unit 20 as needed. For instance, soil 5 can be moved on a mesh or shaking conveyor belt in an enclosed gas flushing unit 20 while air 20A is introduced at the end and removed at the beginning of the conveyor. The soil 5 can be hydrated by spraying with water to cool and remove remaining traces of ozone gas in a hydration unit 28. Ozone gas 32 from the ozone flushing unit 20 passes to an ozone removal unit 19. The rotating drum 2 and flue gas treatment system 200 will operate under a slight vacuum to enhance removal of water and volatile organic compounds from soil and prevent escape of untreated gases to the atmosphere. The reduced pressure is created by a vacuum pump 7 installed after the ozone removal unit 19.

Treated soil 5 leaving the ozone flushing unit 20 passes to an optional hydration unit 28 in which moisture can be introduced to the soil if desired. From the hydration unit 28, the treated soil 5 can be passed to a bio treatment unit or bioreactor 29 in which microorganisms such as bacteria, fungi or protozoa are used to degrade, transform or accumulate remaining contaminants in the soil. Any additional soil treatment process steps can also be included as would be apparent to one of ordinary skill in the art.

Through the use of embodiments of the process disclosed herein, organic materials can be oxidized to carbonic gases or transformed to partially oxidized organic compounds, which are typically easier to biodegrade. Without wishing to be bound by theory, it has been found that ozone can act as an oxidizing agent to generate free hydroxyl radicals that can in turn react with organic materials such as petroleum hydrocarbons. This reaction can result in partial or complete oxidation or mineralization of the organic molecules present in the contaminated soil 1. Partial oxidation can make organic compounds more amenable to biodegradation, therefore allowing biological treatment after partial oxidation. The remaining organic materials in the treated soil will therefore degrade faster and achieve lower total petroleum hydrocarbons (TPH) end points when subsequently treated with a biological process, if needed, allowing faster treatment of contaminated soil. Improvements in soil remediation technologies, including optimization of bioremediation, can significantly reduce costs, enhance environmental stewardship and improve safety.

Through the use of the disclosed methods and systems, contaminants in soils may be remediated in the soil phase, as an alternative and/or in addition to remediating the contaminants in the gas phase. Moisture level and heat in the system can be controlled to allow the ozone to reach the contaminants in the soil, to allow the ozone and the contaminants to react. Through the use of agitation and the provision of heat in the disclosed methods and systems, a small amount of ozone can be used to effectively treat the soil.

It should be noted that only the components relevant to the disclosure are shown in the figures, and that many other components normally part of a soil treatment system may not be shown for simplicity.

For the purposes of this specification and appended claims, unless otherwise indicated, all numbers expressing quantities, percentages or proportions, and other numerical values used in the specification and claims are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent.

Unless otherwise specified, the recitation of a genus of elements, materials or other components, from which an individual component or mixture of components can be selected, is intended to include all possible sub-generic combinations of the listed components and mixtures thereof. Also, "comprise," "include" and its variants, are intended to be non-limiting, such that recitation of items in a list is not to the exclusion of other like items that may also be useful in the materials, compositions, methods and systems of this invention.

This written description uses examples to disclose the invention, including the best mode, and also to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

From the above description, those skilled in the art will perceive improvements, changes and modifications, which are intended to be covered by the appended claims.

What is claimed is:

1. A system for treating contaminated soil, comprising:
   a. an agitation unit adapted for agitating a soil-gas mixture having a soil inlet, a soil outlet, an ozone gas inlet and a gas-particulates mixture outlet;
   b. a source of ozone connected to the ozone gas inlet; and
   c. a vacuum pump connected to the gas-particulates mixture outlet such that the vacuum pump can maintain the system under negative pressure.

2. The system of claim 1, further comprising a gas flushing unit connected to the soil outlet adapted for receiving ozone-treated soil and removing ozone from the ozone-treated soil.

3. The system of claim 1, wherein the agitation unit further comprises a second gas inlet capable of receiving gas from a second source of gas.

4. The system of claim 3, wherein the gas received from the second source of gas comprises heated air or steam.

5. The system of claim 1, wherein the agitation unit further comprises an inlet capable of receiving a composition selected from the group consisting of polymers, surfactants, solvents, oxidizers and combinations thereof to the agitating unit.

6. The system of claim 1, wherein the agitation unit is a rotating drum, rotary kiln, pug mill, screw type mixer, fluidized bed reactor, or shaking conveyor belt.

7. The system of claim 1, wherein the agitation unit further comprises at least one sensor for monitoring a condition selected from the group consisting of moisture content, temperature and ozone concentration.

8. The system of claim 1, further comprising a furnace connected to the agitation unit for supplying heated gas to the agitation unit.

9. The system of claim 1, wherein the source of ozone is an ozone generator.

10. The system of claim 2, further comprising an ozone removal unit connected to the gas flushing unit for receiving ozone from the gas flushing unit and converting the ozone to oxygen.

11. The system of claim 9, further comprising an oxygen tank connected to the ozone generator.

12. The system of claim 1, further comprising a conveyor for feeding the contaminated soil to the agitation unit.

13. The system of claim 1, further comprising a line for recycling ozone-containing gas from the agitation unit to the ozone gas inlet.

* * * * *